(12) United States Patent
Eriksson et al.

(10) Patent No.: US 7,363,812 B2
(45) Date of Patent: Apr. 29, 2008

(54) RADAR LEVEL GAUGE WITH VARIABLE TRANSMISSION POWER

(75) Inventors: Mikael Eriksson, Västervik (SE); Tomas Wennerberg, Göteborg (SE)

(73) Assignee: Rosemount Tank Radar AB, Gothenburg (SE)

( * ) Notice: Subject to any disclaimer, the term of this patent is extended or adjusted under 35 U.S.C. 154(b) by 353 days.

(21) Appl. No.: 11/270,030

(22) Filed: Nov. 9, 2005

(65) Prior Publication Data

US 2007/0101810 A1    May 10, 2007

(51) Int. Cl.
  *G01F 23/00*    (2006.01)
(52) U.S. Cl. .................. 73/290 V; 73/290 R
(58) Field of Classification Search ............ 73/290 V, 73/290 R
See application file for complete search history.

(56) References Cited

U.S. PATENT DOCUMENTS

| | | | |
|---|---|---|---|
| 4,302,623 A | * | 11/1981 | Canfield ...................... 373/33 |
| 5,611,239 A | * | 3/1997 | Klinshteyn ................. 73/290 V |
| 5,734,346 A | | 3/1998 | Richardson et al. ......... 342/124 |
| 5,898,401 A | | 4/1999 | Walls ........................... 342/82 |
| 6,211,815 B1 | | 4/2001 | Richey et al. .............. 342/194 |
| 2002/0158791 A1 | | 10/2002 | Meier ........................... 342/70 |
| 2004/0004567 A1 | | 1/2004 | Kroeger et al. ............. 342/109 |

\* cited by examiner

*Primary Examiner*—Hezron Williams
*Assistant Examiner*—Rodney Frank
(74) *Attorney, Agent, or Firm*—Westman, Champlin & Kelly, P.A.

(57) ABSTRACT

A pulsed radar level gauge, comprising a transmitter for generating and transmitting a signal in the form of a pulse train, means for receiving pulses reflected in said tank, and to form an analogue tank signal based on these reflections, an analogue to digital converter for sampling and digitizing said tank signal and forming a digital time domain reflectometry (TDR) signal, and means for varying the output power of said transmitter during the transmission of said pulse train, in order to adjust an amplitude of said analogue tank signal to match the dynamics of said A/D-converter.

A gain function applied on the receiver side is thus replaced by varying the output power on the transmitter side. This allows the signal-to-noise ratio to be improved, as the noise will not be amplified together with the signal.

18 Claims, 5 Drawing Sheets

RADAR LEVEL GAUGE WITH VARIABLE TRANSMISSION POWER

TECHNICAL FIELD

The present invention relates to pulsed radar level gauges used for determining a process variable of a content in a tank.

TECHNICAL BACKGROUND

In a conventional pulsed radar level gauge, constant power pulses are transmitted into the tank with a repetition frequency in the range 100 kHz to a few MHz. The pulses can be DC pulses or pulses modulated on a microwave frequency carrier wave. The pulse can be guided by a wave guiding structure into the tank, or be allowed to propagate freely. On the receiver side, a reflection from the interior of the tank is received, and a low frequency analogue tank signal is formed and then digitized to form a digital time domain reflectometry (TDR) signal.

Before the A/D-conversion, the analogue tank signal is amplified, partly with a ramp gain function and partly with a constant gain. The reason for this amplification is to match the received signal to the dynamics of the A/D-converter.

First of all, it is important to avoid saturation of the A/D-converter. However, it is also advantageous if as much as possible of the dynamic range of the A/D-converter is effectively utilized, as this increases the resolution of the digital signal, enabling a more exact identification and location of echoes. Therefore, the amplification of the tank signal is ideally arranged to ensure that all the peaks in the amplified tank signal are as close as possible to the maximum level of the A/D-converter, without exceeding it.

The ramp gain function suppresses the early portion of the tank signal (corresponding to reflections close to the top of the tank) while amplifying the final portion of the tank signal (corresponding to reflections close to the bottom of the tank). The reason for the gain function is that reflections occurring close to the top of the tank are stronger than reflections occurring close to the bottom of the tank. In a guided wave RLG, this is because pulses reflected close to the bottom of the tank travel a longer distance in the wave guide and thus are dampened to a larger extent. In a free propagating RLG, this is mainly because the emitted pulse is spread more before being reflected. The ramp thus serves to compensate for this effect of varying signal strength, so as to "even out" any peaks occurring in the tank signal, enabling a better utilization of the dynamic range of the A/D-converter. Such a linear gain may be calibrated during manufacturing, but will then remain unaltered.

The constant gain is used to ensure that the strongest echo in the tank signal is as close to the maximum level of the A/D-converter as possible. This constant gain can be controlled by software in the gauge.

A drawback with the above described solution is that the received signal and any noise are amplified an equal amount. Therefore, the signal-to-noise ratio of the tank signal is not improved, and leads to an imperfect utilization of the dynamic range of the A/D-converter.

An additional drawback is that the linear gain function on the receiver side will distort the tank signal, as the rising edge and falling edge of a peak will be amplified with different gains. Such distortions can lead to erroneous determination of the peak location, and must be compensated for later on in the processing, leading to more complex processing. Yet another drawback is that the gain function cannot compensate for variations in the actual conditions in the tank.

DISCLOSURE OF THE INVENTION

It is an object with the present invention to at least partly overcome at least one of the above problems, and to provide a radar level gauge having an improved utilization of the dynamic range of the A/D-converter.

This and other objects are achieved with a pulsed radar level gauge and a method for determining at least one process variable in a tank, according to the present invention.

According to a first aspect of the present invention, there is provided a pulsed radar level gauge comprising a transmitter for generating and transmitting a signal in the form of a pulse train, means for guiding the pulse train into the tank, and allowing it to propagate towards the content in the tank, means for receiving pulses reflected in said tank, and to form an analogue tank signal based on these reflections, the tank signal comprising at least one peak indicating a surface echo, an analogue to digital converter for sampling and digitizing the tank signal and forming a digital time domain reflectometry (TDR) signal, processing circuitry arranged to determine the process variable based on the digitized tank signal, and means for varying the output power of said transmitter during the transmission of the pulse train, in order to adjust an amplitude of said analogue tank signal to match the dynamics of said A/D-converter.

The expression "radar level gauge" is here intended to include systems employing free propagating radar as well as systems employing guided wave radar.

The tank signal is normally described as the reflection of a pulse from the interior of the tank and any surface interface. However, in reality the transmitter has a very high repetition frequency, and the receiver forms the analogue tank signal from a large number of pulses, typically in the order of thousands, transmitted as a pulse train. The expression "pulse train" should thus here be understood as a set of pulses used for generation of one tank signal.

The invention is based on the realization that it is possible to adjust the reflected energy by varying the output power of the transmitter during the transmission of such a pulse train. This means that pulses contributing to different parts of the tank signal can be transmitted with different power, to ensure that the tank signal from all parts of the tank matches the dynamics of the A/D-converter.

According to the present invention, a gain function applied on the receiver side can thus be replaced (or complemented) by varying the output power on the transmitter side. This allows the signal-to-noise ratio to be improved, as the noise will not be amplified together with the signal.

According to one embodiment, the means for varying the output power of the transmitter can be arranged to ensure that pulses contributing to a first portion of the tank signal have a first output power, the first portion corresponding to reflections near the top of the tank, and that pulses contributing to a second portion of the tank signal have a second output power, the second portion corresponding to reflections near the bottom of the tank. Preferably, the first output level is lower than the second output level, as reflections near the top of the tank, typically are comparatively strong, while reflections near the bottom of the tank are typically comparatively weak. The variation can be continuous, and will then essentially correspond to applying a ramp gain function on the receiver side, but with increased signal-to-noise ratio.

According to a further embodiment, the radar level gauge comprises a feedback path for feedback of the tank signal to the power varying means. This allows for adaptive variation of the output power, enabling compensation for varying conditions in the tank.

According to yet another embodiment, the RLG comprises an amplifier arranged to apply an adaptive gain to the analogue tank signal before supplying it to the A/D-converter. Such adaptive gain allows further adjustment of the analogue tank signal before providing it to the A/D-converter. The amplifier can be controlled by feedback of the tank signal.

BRIEF DESCRIPTION OF THE DRAWINGS

These and other aspects of the present invention will be described in more detail with reference to the appended drawings, illustrating presently preferred embodiments.

DETAILED DESCRIPTION OF THE PREFERRED EMBODIMENTS

Figure 1:
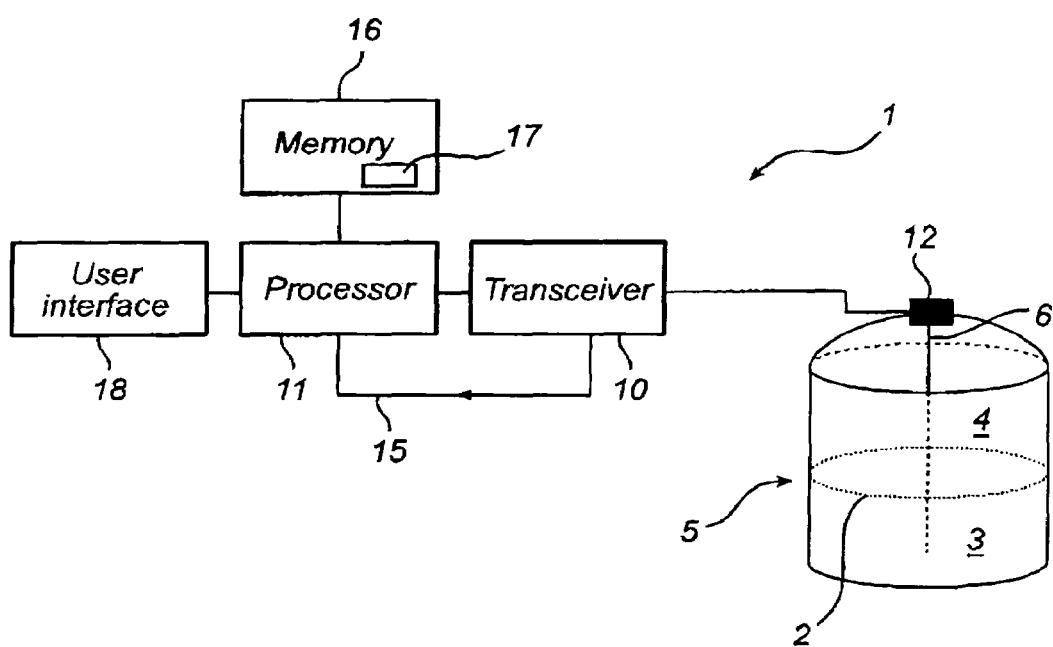
FIG. 1 shows schematically a guided wave radar level gauge system.
Figure 2:
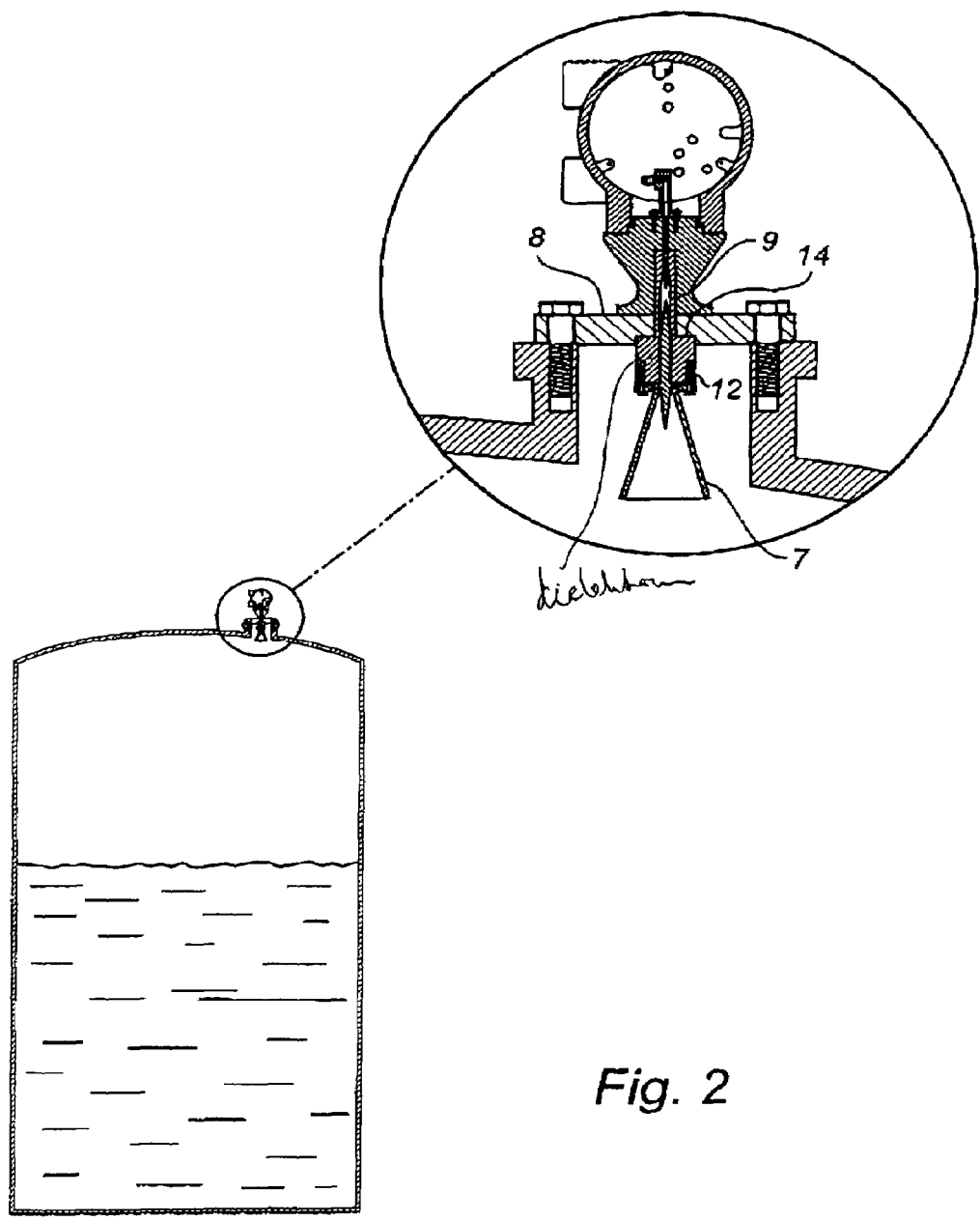
FIG. 2 shows a section of a free propagating radar level gauge system.

FIGS. 1 and 2 schematically show two different types of pulsed radar level gauges (RLG) 1 in which a method according to the invention may be advantageously used.

In both figures, the RLG 1 is arranged to perform measurements of a process variable in a tank, such as the level of an interface 2 between two (or more) materials 3, 4 in the tank 5. Typically, the first material 3 is a content stored in the tank, e.g. a liquid such as gasoline, while the second material 4 is air or some other atmosphere. In that case, the RLG will enable detection of the level of the surface of the content in the tank. Typically, only the level of a first liquid surface is measured, and/or a second liquid surface if the first liquid is sufficiently transparent.

In both figures, the RLG 1 comprises a transceiver 10, controlled by a processor 11 to transmit electromagnetic signals to a signal medium interface 12 in the tank 5. The signals can be DC pulses with a length of about 2 ns or less, with a frequency in the order of MHz, at average power levels in the mW or µW area. Alternatively, the pulses can be modulated on a carrier wave of a GHz frequency (microwaves).

In the system in FIG. 1, the signal medium interface 12 is connected to a wave guiding structure 6 extending into the content of the tank. As mentioned, such a system is referred to as a guided wave radar system, and is typically suitable when the transmitted signals are unmodulated DC pulses, but can also be used when the pulses are modulated on a high frequency carrier wave.

The wave guiding structure can be a hollow wave guide or some sort of probe, such as a coaxial probe, a twin (wire) probe, or a single (wire) probe (also referred to as a surface wave guide). Electromagnetic waves transmitted along the structure 6 will be reflected by any interface 2 between materials in the tank, and the reflection will be transmitted back to the signal medium interface 12.

In the system in FIG. 2, the signal medium interface 12 is instead connected to a radar antenna 7, arranged to emit the transmitted waves to freely propagate into the tank, and to receive waves that are reflected by any interface 2 between materials in the tank. Such a system is referred to as a free propagating radar system, and is suitable when the pulse is modulated on a high frequency carrier wave.

As shown in more detail in FIG. 2, the tank can be provided with a fastening structure 8 securing the signal medium interface 12 in a measuring position fixed relative the bottom of the tank 5. The fastening structure is preferably coupled to a feed through structure 9 in the upper boundary of the tank 5. As shown in FIG. 2, this feed through structure 9 can be wave guide provided with a gas tight sealing 14 capable of withstanding temperature, pressure, and any chemicals contained in the tank.

The processor 11 is connected to a memory 16, typically comprising an EEPROM for storing pre-programmed parameters, a readable storage medium for storing software code portions 17 executable by the processor 11, and a RAM to be used by the microprocessor when executing the software 17. The processor can also be connected to a user interface 18. The software 17 is adapted for analyzing a digitized time domain reflectometry (TDR) signal in order to determine a process variable in the tank, typically the level of the surface 2.

In a pulsed level gauge system, the transit time for the pulsed signals before returning as echo signals is used for measuring the level in the container or tank. The illustrated systems are adapted to provide an indirect measurement of the transit time. In other words, instead of measuring the direct transit time for an individual pulse (which is very short) the reflected signals are measured only during a predetermined time slot. The time slot typically has a defined start time A and stop time B, both A and B being certain time periods after the emission of the pulsed signal. If a reflected signal is received during the duration of said time slot, it means that the transit time is in the range A to B, and if a reflected signal is not received during said time slot, it implies that the transit time is outside said time range. By displacing the time slot in time, i.e. changing the values A and B between different slots, it is possible to determine the transit time with very high precision and accuracy, even when high speed propagating signals are used. This type of system is often referred to as a time expansion achieved by using repetitive sequential sampling, or simply as a sequential sampling system. The same sequential sampling principal is per se also used in sampling oscilloscopes.

Figure 3A:
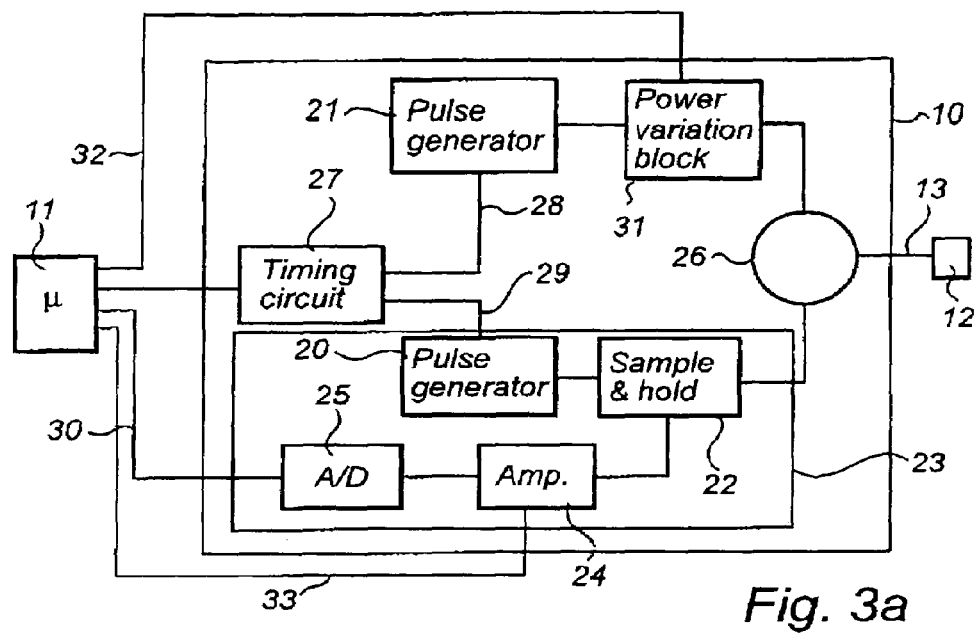
FIG. 3a shows a block diagram of a transceiver according to a first embodiment of the invention.

FIG. 3a shows a transceiver 10 suitable for use in a system where unmodulated DC pulses are transmitted into the tank. A transmitter 21, e.g. in the form of a pulse generator, is arranged to generate pulses with a length of about 2 ns or less at average power levels in the nW or µW area. A receiver 23 comprises a second pulse generator 20, a sample-and-hold circuit 22, an amplifier 24, and an A/D-converter 25. The sample-and-hold circuit 22 is connected to the pulse generator 20 and to the line 13. The output of the sample-and-hold circuit 22 is connected to the A/D-converter 25 via the amplifier 24. A directional coupler 26 is provided to direct the signal from the transmitter 21 to the signal medium interface 12 in the tank and to direct reflected signals from the signal medium interface to the receiver 23.

Alternatively, the coupler 26 in FIG. 3a can be replaced by a microwave switch, as disclosed in the co-pending U.S. patent application Ser. No. 10/938,128.

The pulse generators 20, 21 are controlled by a timing circuit, to generate pulses with a repetition frequency in the order of MHz, e.g. 1.8 MHz. For this purpose, the timing circuit 27 provides each pulse generator with a high frequency clock signal 28, 29. The delta frequency between the clock signals is typically in the order of 10 Hz. The timing circuit is driven by the processor 11.

During measurement, the pulse generator 21 transmits pulses which are guided into the tank by the guiding structure 6. The transmitted pulses are reflected in the interior of the tank, e.g. against any surface interface between different contents, and are fed by the signal medium interface 12 back to the transceiver 10. Here, they are received by the sample and hold circuit 22 in the receiver 23. The sample-and-hold circuit forms an analogue tank signal with a predetermined length by sequential sampling of the reflections from a pulse train including a large number pulses to. A typical length of a tank signal is 100 ms, which means that with a repetition frequency of 1.8 MHz the tank signal is based on 180000 pulse reflections. The analogue tank signal is amplified by amplifier 24 and sampled and digitalized by A/D-converter 25, and the resulting digitalized TDR signal 30 is provided to the processor 11. As mentioned above, due to the sequential sampling, the signal 30 is expanded in time, allowing for use of less expensive hardware for conditioning and processing.

According to this embodiment of the present invention, the transmitter side is further provided with an output power variation block 31, adapted to vary the power of the transmitted pulses within a pulse train. The output power variation block can be integrated in the pulse generator, or be a separate structure. In a simple case, the variation may be predetermined, and adjusted to compensate for known conditions in the tank. For example, such variation may include a linearly increasing power for the pulses in each pulse train, so that pulses contributing to the tank signal representing weak echoes from the bottom of the tank will have a higher output power.

The power can be piece-wise constant, such that the level of each pulse is constant, or it can be continuously varying, such that also the level of each pulse changes. Viss fördröjning?

Alternatively, or in combination, a feedback path 32 is provided from the processor 11, to enable the output power variation block 31 to vary the output power based on the received tank signal 30. In FIG. 3a, the feedback path 32 is simply indicated by a separate connection from the processor 11 to the variable power stage 31. The processor will receive the digitized tank signal 30 from the receiver 23, and will then control the variable power stage of the transmitter based on this signal. The feedback could alternatively be formed by a separate feedback block connected between the receiver 23 and the block 31. Such tank signal feedback makes it possible to adaptively compensate the transmitted power for the actual conditions in the tank.

Optionally, the amplifier 24 can be arranged to provide an adaptive gain, and can then be controlled by a second feedback path 33, provided from the processor 11 to the amplifier 24. This allows for adaptive gain of the analogue tank signal output from the sample-and-hold circuit, to even further improve the utilization of the dynamic range of the A/D-converter. Depending on the design of the amplifier, such adaptive gain may be constant (but adapted) for each tank signal, or be variable also across each tank signal. This functionality will be described in more detail below.

Figure 3B:
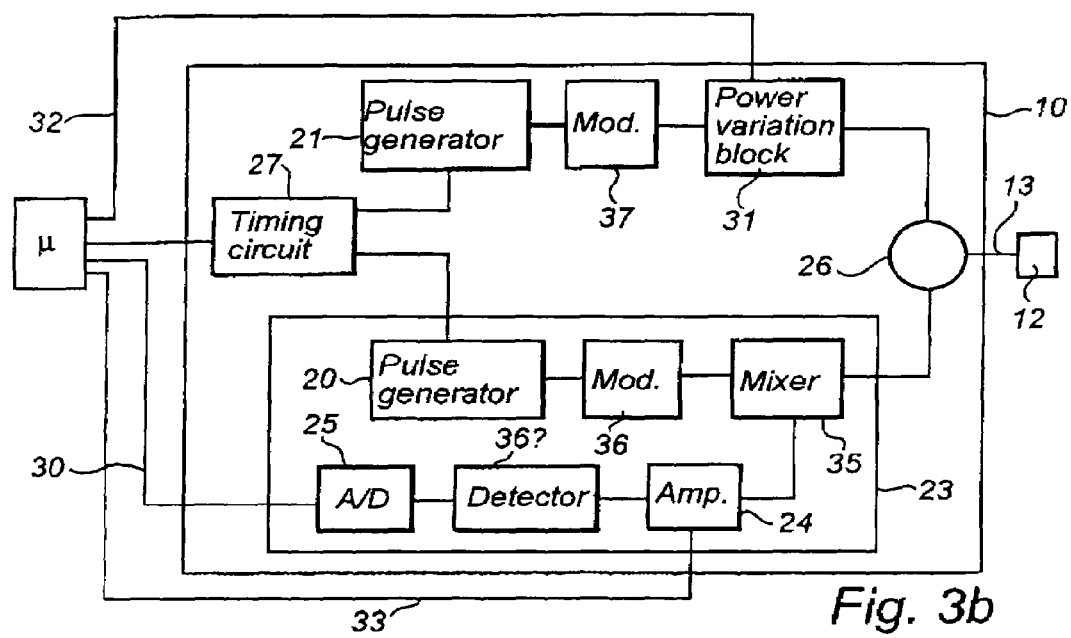
FIG. 3b shows a block diagram of a transceiver according to a second embodiment of the invention.

FIG. 3b shows a transceiver 10 suitable for use in a free propagating system, where the pulses are modulated by a high frequency carrier wave. Elements having similar structure and functionality as in FIG. 3a have been indicated with identical numerals.

In this case, the sample-and-hold circuit is replaced by a mixer 35, adapted to mix the signal received from the coupler with a pulse train from the pulse generator 20, modulated by a microwave modulator 36. The output from the mixer 35 is provided to a detector 36 via the amplifier 24. The detector serves to remove the microwave carrier, in a similar way as an A/M receiver.

On the transmitter side, the pulses from the pulse generator 21 are also modulated by a microwave modulator 37, before being connected to the coupler 26. In this case, the coupler cannot be replaced by a microwave switch.

The output power variation block 31 and any feedback paths 32, 33 are provided in the same way as in the transceiver in FIG. 3a. The output power variation block 31 is arranged after the modulator 37 in FIG. 3b, but may of course also be arranged before the modulator 37. That would be the case for example when the variation block is integrated with the pulse generator 21.

With reference to FIGS. 4-8, the function of the illustrated systems will be described.

Figure 4:
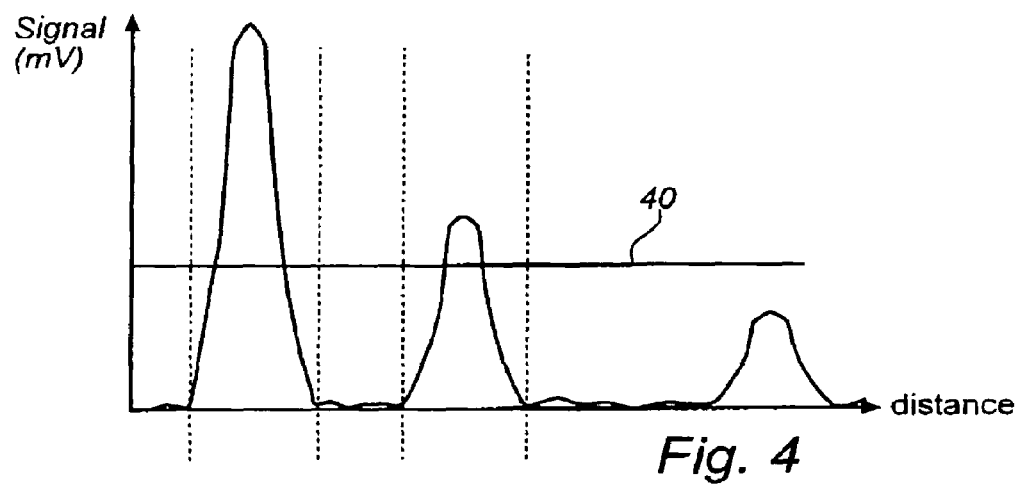
FIG. 4 shows a diagram of a signal representing reflected energy from the tank.

FIG. 4 shows a voltage signal representing the reflected energy from a pulse train having equal output power. In the receiver, this signal is typically in the order of 100 mV. The sample-and-hold circuit 22 or mixer 35 in the receiver 23 will be adapted to handle voltages within a given range, e.g. 0-250 mV in the case of a sample-and-hold circuit. The upper limit of this range is indicated in FIG. 4 by the line 40. As can be seen, the two largest peaks in the reflected energy exceed this limit, and would be truncated by the receiver 23 unless suppressed in some way.

To avoid this problem, the transmitter can be arranged to transmit a weaker power during a start-up phase of the measurement. During this phase, a lower power is transmitted, that is chosen such that it results in peaks well below the saturation limit of the receiver. A suitable power level for this initial measuring may be a preset value, or be determined through an iterative process.

Figure 5:
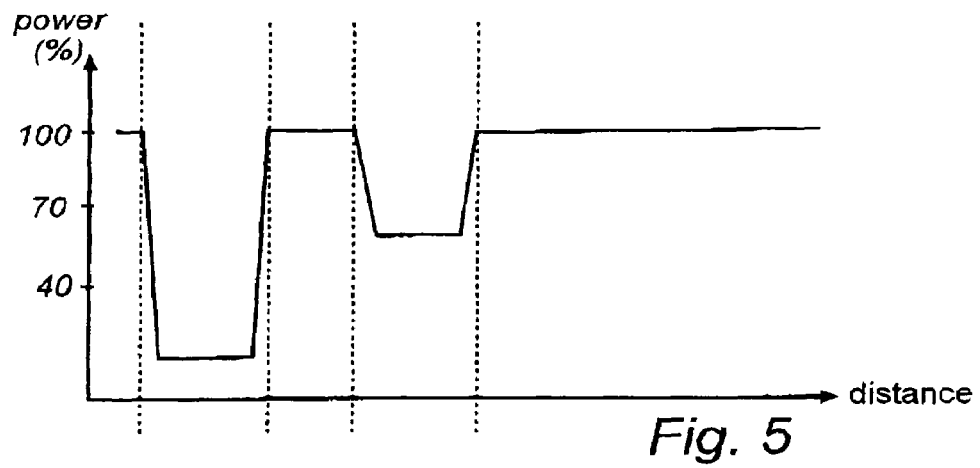
FIG. 5 shows a diagram of adjusted transmitted power over time.

Based on this unsaturated tank signal, the processor 11 can determine a suitable output power for those parts of the transmitted pulse train corresponding to the large peaks. In the illustrated example, the adapted output power could be as shown in FIG. 5. The curve in figure indicates that the output power is reduced to below 40% during the time of the first peak, and to around 70% during the time of the second peak. For all other parts of the pulse train, the output power is 100%.

Figure 6:
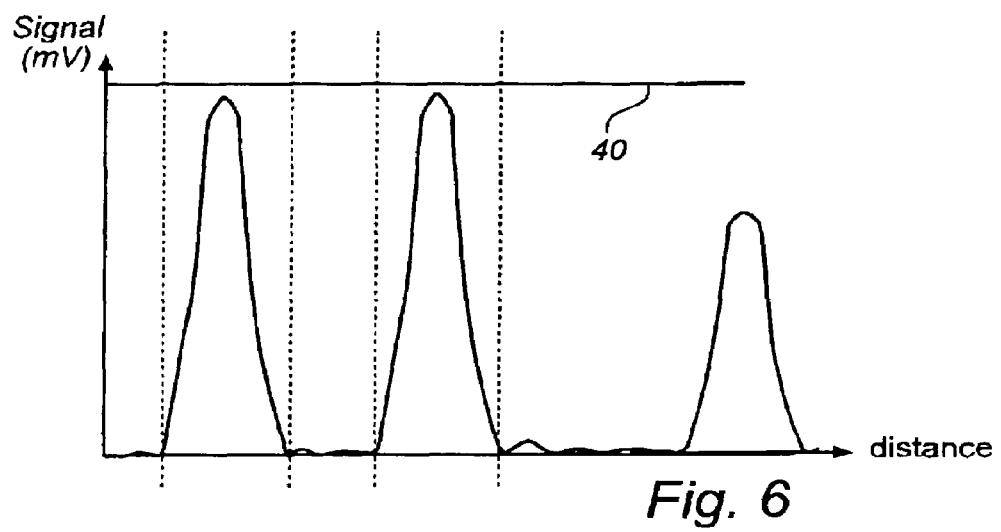
FIG. 6 shows a tank signal resulting from the transmitted power according to FIG. 5.

The result is a reflected energy as shown in FIG. 6. Here, all the peaks are below the upper limit of the receiver (again indicated by the line 40). This tank signal is then amplified by the amplifier 24, to match the dynamic range of the A/D-converter 25. In its most simple form, the amplification is just a constant gain, adapted to match the maximum output from the sample-and-hold circuit 22 or mixer 35 with the upper limit of the A/D-converter 25. Thus, all the peaks will stay within the dynamic range of the A/D-converter 25.

With an adaptive process as described with reference to FIGS. 4-6, a weak peak will always be exposed to full power, while stronger peaks will be exposed to reduced power. This adaptation is independent of the distance to the top of the tank, and is instead based on the actual conditions in the tank. By this adaptive control of transmitted power, the dynamic range of the receiver 23, e.g. the sample-and-hold circuit 22 or mixer 35 and the A/D-converter 25, can be utilized efficiently.

As mentioned, the digitized TDR signal is supplied to the processor 11 for processing and analysis. In order to enable comparison of different echoes, occurring in different regions of the tank, the relative signal strength in a located peak must be determined. The processing software can therefore be adapted to compensate for any varying output power applied by the transmitter 21. This can be achieved by a simple calculation according to:

$$\text{Signal(Echo)}=\text{LocalMax(Echo)}/\text{PWR(Echo)}, \quad (1)$$

where LocalMax(Echo) is the value from the TDR signal for the peak of interest, and PWR(Echo) is the transmitted power of the pulse that contributed to the TDR signal at the location of the peak of interest.

It should be noted that the adaptive control of the output power can be active throughout the measuring process, in order to compensate for changing circumstances in the tank. In other words, if the reflected energy of a peak decreases, the output power can be increased correspondingly. In the same way, if the reflected energy increases, the output power should be reduced. Note that it is possible that a quick change in conditions may cause the receiver to saturate before the output power is adapted. If this occurs, it may be advantageous to discard this particular tank signal, in order to avoid erroneous measurement results.

In the curve in FIG. 6, the third, smaller peak has a peak value a distance below the upper limit of the receiver 23. According to one embodiment of the invention, in order to improve the utilization of the dynamic range of the A/D-converter 25 even further, the amplifier 24 can be controlled by the feedback path 33 adapted to apply an adaptive gain, so as to increase any such "low" peak to a level closer to the limit of the A/D-converter.

In a simple case, the amplifier 24 is adapted to apply an adapted constant gain over the entire tank signal. In this case, a small peak, such as the third peak in figure 6, can be "zoomed in" before applying the gain, by setting the output energy of pulses related to other parts of the tank signal to zero. This will result in a partial tank signal, where the larger peaks have been cancelled. Note that, in this case, the output power of the transmitter was already 100% for the peak of interest, so the peak cannot be increased further. Instead, the constant gain can now be increased, and the entire tank signal can be amplified such that the small peak is better adapted to the dynamic range of the A/D-converter 24. As the larger peaks have been removed, there is less risk of saturation. An advantage of this embodiment of the adaptive gain is that the design of the amplifier can be simplified, as the gain does not need to be varied across the tank signal.

Figure 7:
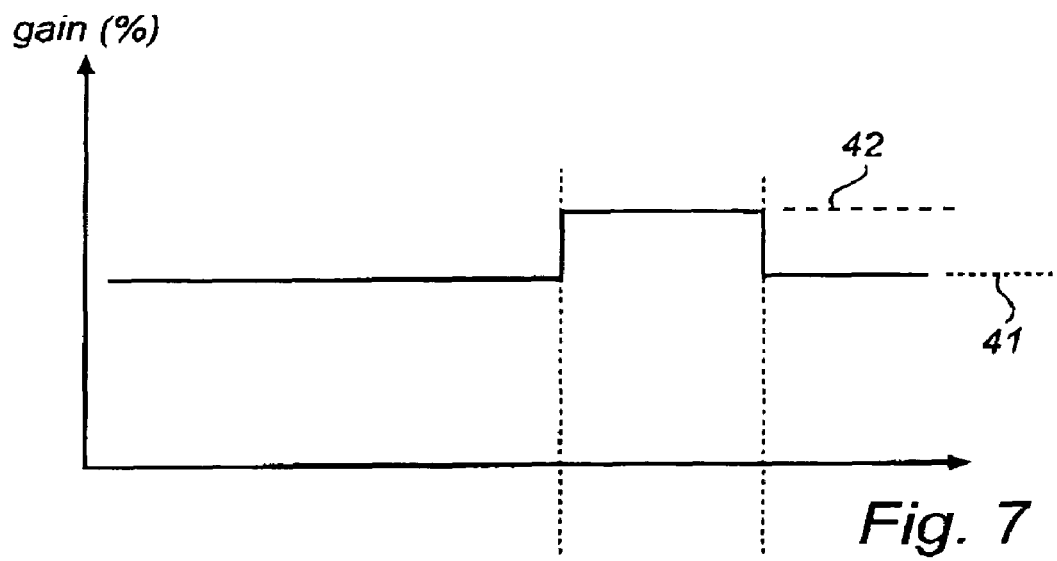
FIG. 7 shows a diagram of an adaptive gain applied to the analogue tank signal.
Figure 8:
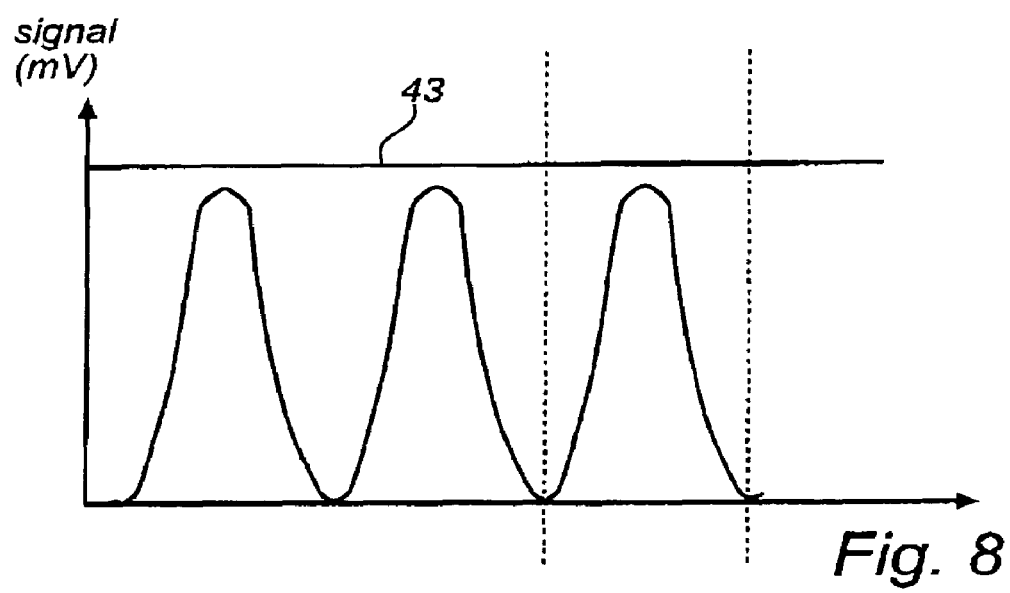
FIG. 8 shows a tank signal resulting from the gain in FIG. 7.

According to another embodiment, the amplifier 24 is adapted to apply a gain which can be adaptively varied across the tank signal. FIG. 7 illustrates such a variable gain function. In FIG. 7, level 41 indicates a gain adapted to match the maximum output from the sample-and-hold circuit 22 or mixer 35 with the upper limit of the A/D-converter 25. For the part of the tank signal corresponding to the "low" peak, the gain has been increased (portion 42), so that an additional amplification of this part is achieved. The resulting tank signal is shown in FIG. 8. As is clear from FIG. 8, all peaks are now essentially equal in amplitude, and the amplification is advantageously chosen such that this amplitude is close to the limit of the A/D-converter, indicated by line 43 in FIG. 8.

In this case, where a variable amplification is applied across the tank signal in the receiver 23, the processing software should be adapted to compensate also for this gain, in order to allow comparison of different peaks in the tank signal. The relationship (1) above will then be extended to:

$$\text{Signal(Echo)}=\text{LocalMax(Echo)}/\text{PWR(Echo)}/\text{Gain(Echo)}, \quad (2)$$

where Gain(Echo) is the gain applied by the amplifier 24 to the TDR signal at the location of the peak of interest.

It should be understood that the above described functionality can be implemented in the software 17 loaded into the memory 16 and executed by the processor 11. Alternatively, or in combination, some parts of the described functionality, e.g. the feedback to power variation block 31 and/or amplifier 24, can be implemented in hardware. The software and hardware may be adapted based on the application of use and the installation of the radar level gauge.

The person skilled in the art realises that the present invention by no means is limited to the preferred embodiments described above. On the contrary, many modifications and variations are possible within the scope of the appended claims. For example, the block diagrams are only intended to schematically show the design of the transceiver, and its function. Many variations are thus possible. Further, may variations of the described functions are possible, by adaption of the software 17.

What is claimed is:

1. A pulsed radar level gauge (RLG) used for determining a process variable of a content in a tank, comprising:
a transmitter for generating and transmitting a signal in the form of a pulse train; means for guiding said pulse train into the tank, and allowing it to propagate towards the content in the tank; means for receiving pulses reflected in said tank, and to form an analogue tank signal based on these reflections, said tank signal comprising at least one peak indicating a surface echo; an analogue to digital converter for sampling and digitizing said tank signal and forming a digital time domain reflectometry (TDR) signal; processing circuitry arranged to determine said process variable based on said TDR signal; and means for varying the output power of said transmitter during the transmission of said pulse train, in order to adjust an amplitude of said analogue tank signal to match the dynamics of said A/D-converter.

2. The RLG according to claim 1, wherein said means for varying the output power of said transmitter are arranged to ensure that pulses contributing to a first portion of the tank signal have a first output power, said first portion corresponding to reflections near the top of the tank, and that pulses contributing to a second portion of the tank signal have a second output power, said second portion corresponding to reflections near the bottom of the tank.

3. The RLG according to claim 2, wherein said first output power is lower than said second output power.

4. The RLG according to claim 1, wherein said means for varying the output power of said transmitter are arranged to vary said output power continuously over said pulse train.

5. The RLG according to claim 1, further comprising:
a feedback path for providing a feedback based on said tank signal to said means for varying the output power of said transmitter;
wherein said means for varying the output power of said transmitter are arranged to adaptively vary the output power based on said feedback signal.

6. The RLG according to claim 5;
wherein said tank signal comprises at least a first peak and second peak having a greater received energy than said first peak; and
wherein said means for varying the output power of said transmitter are arranged to ensure that pulses contributing to a portion of the tank signal containing said first peak have a greater output power than pulses contributing to a portion of the tank signal containing said second peak.

7. The RLG according to claim 1, further comprising an amplifier arranged to apply an adaptive gain to the analogue tank signal before supplying it to the A/D-converter.

8. The RLG according to claim 7, further comprising a feedback path for providing a feedback based on said tank signal to said amplifier, wherein said amplifier is arranged to adaptively vary the gain based on said feedback signal.

9. The RLG according to claim 1, wherein said transmitted pulses are DC pulses, and wherein said means for forming said analogue tank signal comprises a sample-and-hold circuit adapted to receive said reflected pulses and for generating said analogue tank signal.

10. The RLG according to claim 1, wherein said transmitted pulses are high frequency modulated, and wherein said means for forming said analogue tank signal comprises a mixer for mixing said reflected pulses with a modulated pulse train, and a detector for removing any high frequency content and generating said analogue tank signal.

11. A method for determining at least one process variable of a content in a tank, comprising:
generating and transmitting a signal in the form of a pulse train;
guiding said pulse train into the tank, and allowing it to propagate towards the content in the tank;
receiving reflections of said pulse train and forming an analogue tank signal based on these reflections, said tank signal comprising at least one peak indicating a surface echo;
sampling and digitizing said tank signal in an A/D-converter to form a digital time domain ref reflectometry (TDR) signal;
varying the output power of said transmitter during the transmission of said pulse train, in order to adjust an amplitude of said analogue tank signal to match dynamics of said A/D-converter; and
determining said process variable based on said TDR signal.

12. The method according to claim 11, wherein the output power is varied so that pulses contributing to a first portion of the tank signal have a first output power, said first portion corresponding to reflections near the top of the tank, and so that pulses contributing to a second portion of the tank signal have a second output power, said second portion corresponding to reflections near the bottom of the tank.

13. The method according to claim 12, wherein said first output power is lower than said second output power.

14. The method according to claim 11, wherein the output power is varied continuously over said pulse train.

15. The method according to claim 11, further comprising:
providing a feedback based on said tank signal; and
varying the output power of said transmitter adaptively vary the output power based on said feedback signal.

16. The method according to claim 15;
wherein said tank signal comprises at least a first peak and second peak having a greater received energy than said first peak; and
wherein the output power is varied so that pulses contributing to a portion of the tank signal containing said first peak have a greater output power than pulses contributing to a portion of the tank signal containing said second peak.

17. The method according to claim 11, further comprising applying an adaptive gain to the analogue tank signal before supplying it to the A/D-converter.

18. The method according to claim 17, further comprising:
providing a feedback based on said tank signal to said amplifier; and
adaptively vary the gain based on said feedback signal.

* * * * *